(12) United States Patent  (10) Patent No.: US 8,489,330 B2
Ellanti et al.  (45) Date of Patent: Jul. 16, 2013

(54) NAVIGATION SYSTEM WITH DISTANCE LIMITATION MECHANISM AND METHOD OF OPERATION THEREOF

(75) Inventors: Manohar Ellanti, Fremont, CA (US); Hengbin Luo, San Jose, CA (US); John Young, Seattle, WA (US); Jose Bedolla, Berkeley, CA (US)

(73) Assignee: FleetCor Technologies Operating Company, LLC, Norcross, GA (US)

( * ) Notice: Subject to any disclaimer, the term of this patent is extended or adjusted under 35 U.S.C. 154(b) by 467 days.

(21) Appl. No.: 12/901,518

(22) Filed: Oct. 9, 2010

(65) Prior Publication Data

US 2012/0089328 A1  Apr. 12, 2012

(51) Int. Cl.
*G01C 21/00* (2006.01)
(52) U.S. Cl.
USPC .......................................... 701/468; 701/451
(58) Field of Classification Search
USPC ................. 701/400, 408, 409, 425, 451, 454, 701/468; 455/456.1–456.6; 340/989–995.1
See application file for complete search history.

(56) References Cited

U.S. PATENT DOCUMENTS

| 6,636,805 | B1 | 10/2003 | Tada et al. |
| 6,708,086 | B2 * | 3/2004 | Richard ............................ 701/1 |
| 6,865,457 | B1 * | 3/2005 | Mittelsteadt et al. ........ 701/33.4 |
| 7,366,609 | B2 | 4/2008 | Lee |
| 7,433,676 | B2 | 10/2008 | Kobayashi et al. |
| 2002/0156739 | A1 | 10/2002 | Hirai et al. |
| 2005/0251327 | A1 | 11/2005 | Ogasawara et al. |
| 2006/0173610 | A1 | 8/2006 | Listle |
| 2007/0276584 | A1 | 11/2007 | Veliu et al. |
| 2008/0147318 | A1 | 6/2008 | Steins et al. |
| 2010/0156711 | A1 | 6/2010 | Christensen et al. |

OTHER PUBLICATIONS

International Search Report for Application No. PCT/US2011/053068 dated Feb. 21, 2012.

* cited by examiner

*Primary Examiner* — Richard M. Camby
(74) *Attorney, Agent, or Firm* — King & Spalding

(57) ABSTRACT

A method of operation of a navigation system includes: executing a distance bounded function for displaying on a device; setting a reference location; receiving a user location for monitoring a location of the device; measuring a distance traveled with the user location from the reference location only when the distance bounded function is executing; and deactivating the distance bounded function when the distance traveled equals or exceeds a distance limit.

20 Claims, 6 Drawing Sheets

NAVIGATION SYSTEM WITH DISTANCE LIMITATION MECHANISM AND METHOD OF OPERATION THEREOF

TECHNICAL FIELD

The present invention relates generally to a navigation system, and more particularly to a navigation system with a distance limit.

BACKGROUND ART

Modern portable consumer and industrial electronics provide increasing levels of functionality to support modern life including navigation and location-based information services. This is especially true for devices such as navigation systems, cellular phones, portable digital assistants, and multifunction devices.

As the popularity of these portable consumer and industrial electronic devices increases, new applications, services, and products are developed to meet the diverse needs of the ever expanding population of users. One existing application is the use of location information to provide navigation services, such as a global positioning service (GPS) navigation system, for a mobile device.

Vendors of portable electronic devices, such as navigation systems and location based services enabled systems, have a need to demonstrate the applications, services, and products developed to work with these devices. Furthermore as the number of applications, services, and products developed to work with portable electronic devices has increased, a need has arisen for a demonstration mode that can allow users of these devices to determine which applications, services and products meet their needs.

Currently some portable electronic devices provide demonstration modes that are limited by time or functionality. However, it is often advantageous for both users and vendors to be able to access a fully functional version of an application, service, or product for demonstration purposes. Similarly, time limitations can hamper a user's ability to properly determine whether an application, service, or product meets his or her needs. Likewise such limitations can limit a vendor's ability to properly demonstrate an application, service, or product to a potential customer.

Thus, a need still remains for a navigation system with distance limit mechanism that can overcome the drawbacks of time or functionality limited demonstration modes. In view of the ever-increasing commercial competitive pressures, along with growing consumer expectations and the diminishing opportunities for meaningful product differentiation in the marketplace, it is critical that answers be found for these problems. Additionally, the need to reduce costs, improve efficiencies and performance, and meet competitive pressures adds an even greater urgency to the critical necessity for finding answers to these problems.

Solutions to these problems have been long sought but prior developments have not taught or suggested any solutions and, thus, solutions to these problems have long eluded those skilled in the art.

DISCLOSURE OF THE INVENTION

The present invention provides a method of operation of a navigation system including: executing a distance bounded function for displaying on a device; setting a reference location; receiving a user location for monitoring a location of the device; measuring a distance traveled with the user location from the reference location only when the distance bounded function is executing; and deactivating the distance bounded function when the distance traveled equals or exceeds a distance limit.

The present invention provides a navigation system, including: a control unit for executing a distance bounded function for displaying on a device; a selection module, coupled to the control unit, for setting a reference location; a communication unit, coupled to the control unit, for receiving a user location for monitoring a location of the device; a measuring module, coupled to the selection module, for measuring a distance traveled with the user location from the reference location only when the distance bounded function is executing; and a deactivation module, coupled to the measuring module, for deactivating the distance bounded function when the distance traveled equals or exceeds a distance limit.

Certain embodiments of the invention have other steps or elements in addition to or in place of those mentioned above. The steps or elements will become apparent to those skilled in the art from a reading of the following detailed description when taken with reference to the accompanying drawings.

BEST MODE FOR CARRYING OUT THE INVENTION

Figure 1:
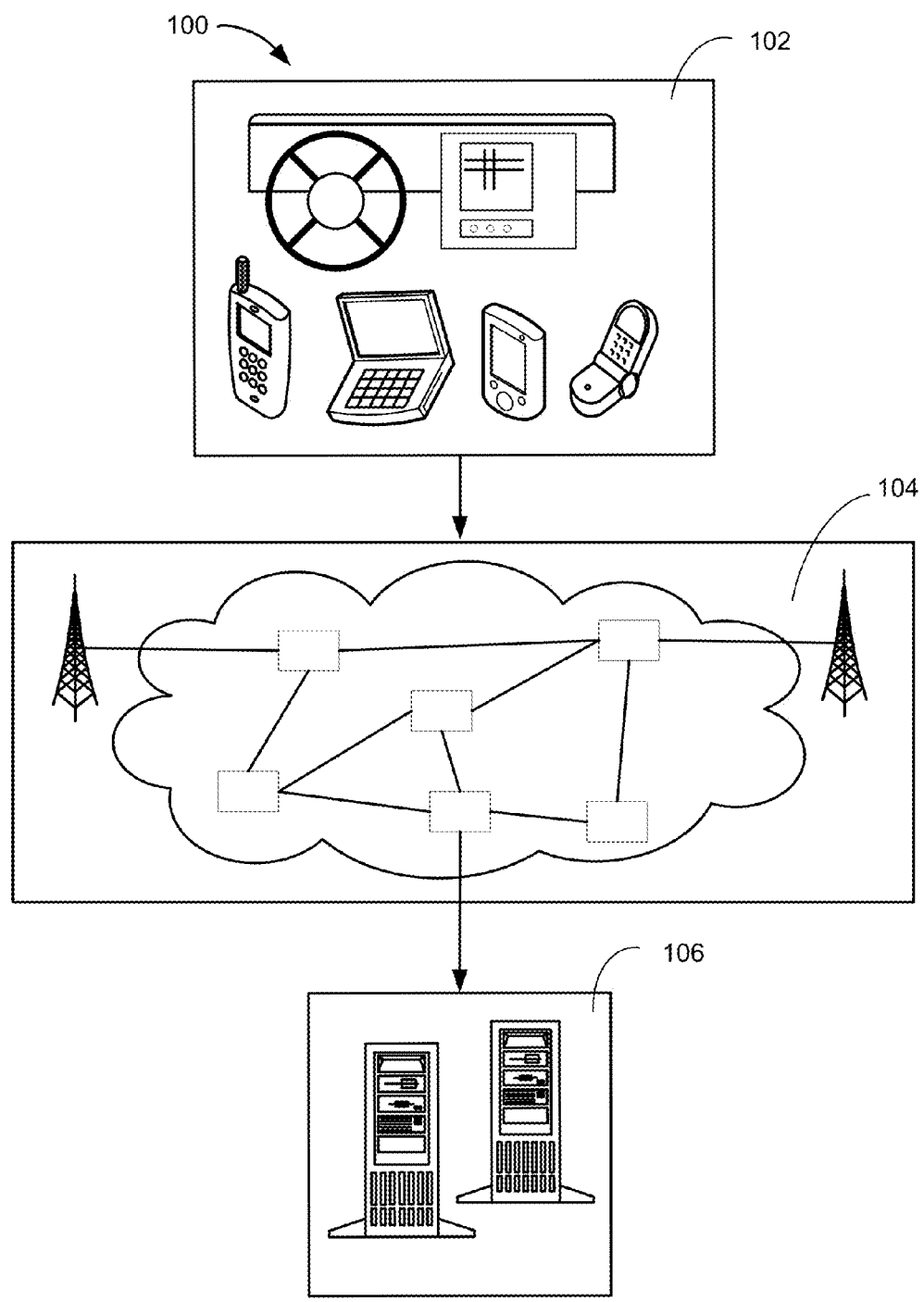
FIG. 1 is a navigation system with distance limitation mechanism in an embodiment of the present invention.

The following embodiments are described in sufficient detail to enable those skilled in the art to make and use the invention. It is to be understood that other embodiments would be evident based on the present disclosure, and that system, process, or mechanical changes may be made without departing from the scope of the present invention.

In the following description, numerous specific details are given to provide a thorough understanding of the invention. However, it will be apparent that the invention may be practiced without these specific details. In order to avoid obscuring the present invention, some well-known circuits, system configurations, and process steps are not disclosed in detail.

The drawings showing embodiments of the system are semi-diagrammatic and not to scale and, particularly, some of the dimensions are for the clarity of presentation and are shown exaggerated in the drawing FIGs. Similarly, although the views in the drawings for ease of description generally show similar orientations, this depiction in the FIGs. is arbitrary for the most part. Generally, the invention can be operated in any orientation.

Where multiple embodiments are disclosed and described having some features in common, for clarity and ease of illustration, description, and comprehension thereof, similar and like features one to another will ordinarily be described with similar reference numerals. The embodiments have been numbered first embodiment, second embodiment, etc. as a matter of descriptive convenience and are not intended to have any other significance or provide limitations for the present invention.

One skilled in the art would appreciate that the format with which navigation information is expressed is not critical to some embodiments of the invention. For example, in some embodiments, navigation information is presented in the format of (X, Y), where X and Y are two ordinates that define the geographic location, i.e., a position of a user.

In an alternative embodiment, navigation information is presented by longitude and latitude related information. In a further embodiment of the present invention, the navigation information also includes a velocity element including a speed component and a heading component.

The term "relevant information" referred to herein comprises the navigation information described as well as information relating to points of interest to the user, such as local business, hours of businesses, types of businesses, advertised specials, traffic information, maps, local events, and nearby community or personal information.

The term "module" referred to herein can include software, hardware, or a combination thereof. For example, the software can be machine code, firmware, embedded code, and application software. Also for example, the hardware can be circuitry, processor, computer, integrated circuit, integrated circuit cores, a pressure sensor, an inertial sensor, a microelectromecahnical system (MEMS), passive devices, or a combination thereof.

The term "coupling" or "coupled" referred to herein can include any physical or non-physical connecting, joining or linking of a device, module, unit or element of the navigation system.

Referring now to FIG. 1, therein is shown a navigation system 100 with distance limitation mechanism in an embodiment of the present invention. The navigation system 100 includes a first device 102, such as a client or a server, connected to a second device 106, such as a client or server, with a communication path 104, such as a wireless or wired network.

For example, the first device 102 can be of any of a variety of mobile devices, such as a cellular phone, personal digital assistant, a notebook computer, automotive telematic navigation system, or other multi-functional mobile communication or entertainment device. The first device 102 can be a standalone device, or can be incorporated with a vehicle, for example a car, truck, bus, or train. The first device 102 can couple to the communication path 104 to communicate with the second device 106.

For illustrative purposes, the navigation system 100 is described with the first device 102 as a mobile computing device, although it is understood that the first device 102 can be different types of computing devices. For example, the first device 102 can also be a non-mobile computing device, such as a server, a server farm, or a desktop computer.

The second device 106 can be any of a variety of centralized or decentralized computing devices. For example, the second device 106 can be a computer, grid computing resources, a virtualized computer resource, cloud computing resource, routers, switches, peer-to-peer distributed computing devices, or a combination thereof.

The second device 106 can be centralized in a single computer room, distributed across different rooms, distributed across different geographical locations, embedded within a telecommunications network. The second device 106 can connect with the communication path 104 to communicate with the first device 102. The second device 106 can also be a client type device as described for the first device 102.

In another example, the first device 102 can be a particularized machine, such as a mainframe, a server, a cluster server, rack mounted server, or a blade server, or as more specific examples, an IBM System z10™ Business Class mainframe or a HP ProLiant ML™ server. Yet another example, the second device 106 can be a particularized machine, such as a portable computing device, a thin client, a notebook, a netbook, a smartphone, personal digital assistant, or a cellular phone, and as specific examples, an Apple iPhone™, Palm Centro™, or Moto Q Global™.

For illustrative purposes, the navigation system 100 is described with the second device 106 as a non-mobile computing device, although it is understood that the second device 106 can be different types of computing devices. For example, the second device 106 can also be a mobile computing device, such as notebook computer, another client device, or a different type of client device. The second device 106 can be a standalone device, or can be incorporated with a vehicle, for example a car, truck, bus, or train.

Also for illustrative purposes, the navigation system 100 is shown with the second device 106 and the first device 102 as end points of the communication path 104, although it is understood that the navigation system 100 can have a different partition between the first device 102, the second device 106, and the communication path 104. For example, the first device 102, the second device 106, or a combination thereof can also function as part of the communication path 104.

The communication path 104 can be a variety of networks. For example, the communication path 104 can include wireless communication, wired communication, optical, ultrasonic, or the combination thereof. Satellite communication, cellular communication, Bluetooth, Infrared Data Association standard (IrDA), wireless fidelity (WiFi), and worldwide interoperability for microwave access (WiMAX) are examples of wireless communication that can be included in the communication path 104. Ethernet, digital subscriber line (DSL), fiber to the home (FTTH), and plain old telephone service (POTS) are examples of wired communication that can be included in the communication path 104.

Further, the communication path 104 can traverse a number of network topologies and distances. For example, the communication path 104 can include direct connection, personal area network (PAN), local area network (LAN), metropolitan area network (MAN), wide area network (WAN) or any combination thereof.

Figure 2:
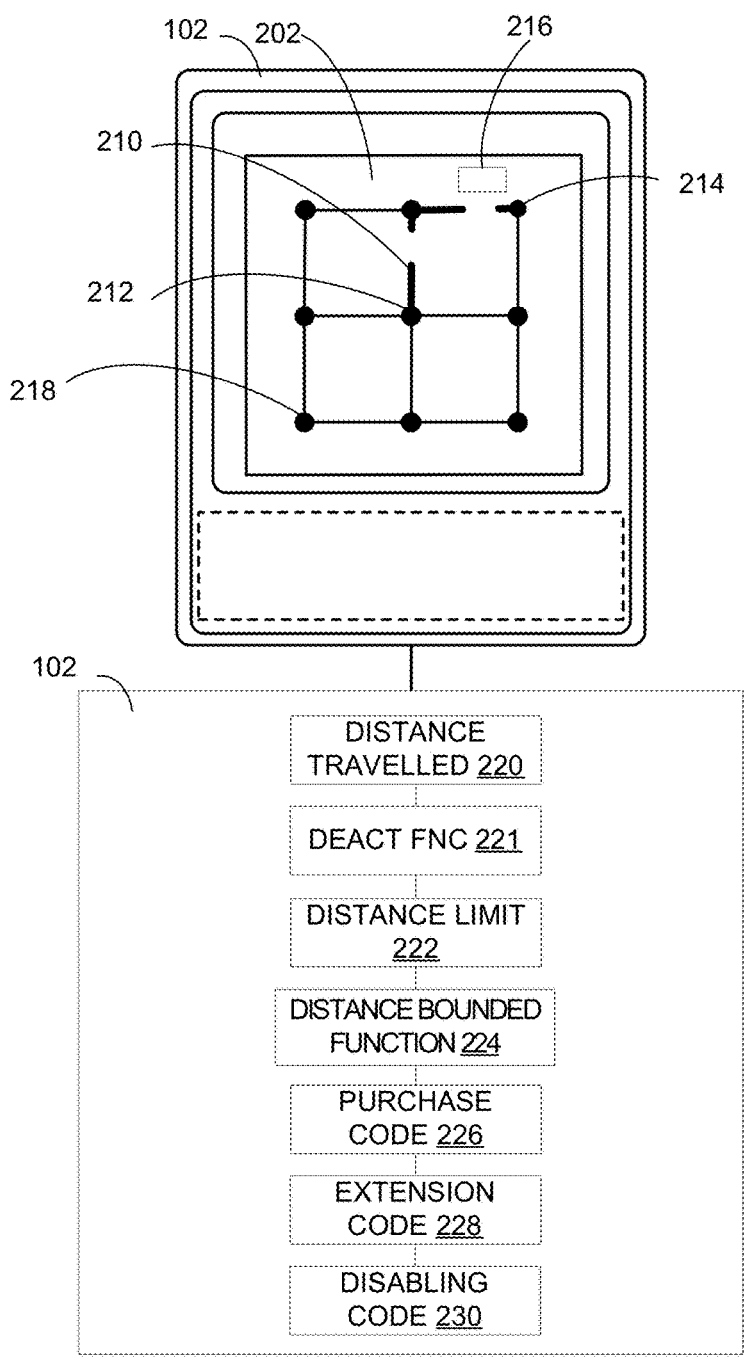
FIG. 2 is a display interface of the first device.

Referring now to FIG. 2, therein is shown a display interface 202 of the first device 102. The display interface 202 can depict a route 210 between a user location 212 and a destination 214. The route 210 is defined as a travel path between the user location 212 and the destination 214. The user location 212 is defined as a current location of the user of the navigation system 100 or the first device 102. For illustrative purposes the route 210 is displayed on a grid, however, it is understood that the route 210 can be displayed as part of any number of visual representations, including street level maps, topographical maps, and satellite images.

The display interface 202 can also display a reminder 216. The reminder 216 conveys information for a distance limit 222, a distance traveled 220, the difference between the distance limit 222 and the distance traveled 220, a notification to enter a purchase code 226, a notification that the navigation system 100 is in demonstration mode, a message informing a user that a deactivation function 221 is deactivated, or a combination thereof. The deactivation function 221 is defined as a function of the navigation system 100 to disable a portion of the operation of the navigation system 100 based on the distance traveled 220 meeting or exceeding the distance limit 222.

For illustrative purposes, the reminder 216 is displayed in the upper right hand corner of the display interface 202, but it is understood that the reminder 216 can be displayed anywhere on the display interface 202. Also for illustrative purposes, the reminder 216 is described as a graphical display, although it is understood that the reminder can be delivered on the first device 102 as an audio prompt, a multimedia prompt, or a physical motion prompt such as a vibration, or a combination thereof.

The navigation system 100 can measure the distance traveled 220 from a reference location 218. The reference location 218 is defined as a location or an area from which the distance traveled 220 is measured therefrom. Examples of the reference location 218 include a building, an address, a park, a parking lot, a stadium, a road, a street corner, a town, a state or an area defined by a vendor of the navigation system 100 or a distance bounded function 224. The distance traveled 220 is a distance measure that a user (not shown) has traveled from the reference location 218 or outside the reference location 218 including the distance the user has walked from the reference location 218 or the distance the user has traveled from the reference location 218 on public transportation.

The distance traveled 220 can be measured in for example feet, yards, miles, meters, or kilometers. The distance traveled 220 can also be measured by detecting when the user has crossed a geographic boundary such as a border of a state, a town, a city, a county, a park or a vendor determined area.

The navigation system 100 can then compare the distance limit 222 to the distance traveled 220 from the reference location 218 to determine if the distance traveled 220 meets or exceeds the distance limit 222. The distance limit 222 defines the threshold limit pass which the demonstration function of the navigation system 100 ceases to operate without further action. The distance limit 222 can be a limit measured in, for example, feet, yards, miles, meters, or kilometers. The distance limit 222 can also be a limit based on the geographic boundary. For example, the limit can be the border of a state, a town, a city, a county, a park or a vendor determined area.

If the navigation system 100 determines that the distance traveled 220 meets or exceeds the distance limit 222 then the deactivation function 221 can deactivate the distance bounded function 224. The distance bounded function 224 is defined as a function or set of functions of the navigation system 100 which operation is limited to the amount of the distance traveled 220 from the reference location 218 and the distance traveled 220 is below the distance limit 222. The navigation system 100 can also deactivate itself.

If the navigation system 100 determines that the purchase code 226 has been received then it can permanently reactivate the distance bounded function 224 or remove the distance limit 222. The purchase code 226 is defined as an access mechanism to enable the operation of the distance bounded function 224 regardless of the distance limit 222 or the distance traveled 220.

If the navigation system 100 determines that an extension code 228 has been received then it can temporarily reactivate the distance bounded function 224. The extension code 228 is defined as a different access mechanism to enable the operation of the distance bounded function 224 by resetting the distance traveled 220, by extending the distance limit 222, or a combination thereof.

The navigation system 100 can stop measuring the distance traveled 220 or comparing the distance traveled 220 to the distance limit 222 if it receives a disabling code 230. The disabling code 230 stops or pauses measuring the distance traveled 220 for the distance bounded function 224 or for the navigation system 100. This can allow users, such as vendors, repair persons or alpha testers, to have unrestricted access to the distance bounded function 224 or the navigation system 100. The navigation system 100 can resume measuring the distance traveled 220 or comparing the distance traveled 220 to the distance limit 222 when the user logs off, when the distance bounded function 224 or the navigation system 100 is turned off or when the navigation system 100 receives a code cancelling the disabling code 230.

For illustrative purposes the navigation system 100 is shown as calculating the distance traveled 220, comparing the distance traveled 220 to the distance limit 222, deactivating the distance bounded function 224 and responding to the input of the purchase code 226, the extension code 228, or the disabling code 230. It is understood, however, that the second device 106 of FIG. 1 can carry out these functions as well.

It has been discovered that the present invention provides the navigation system 100 having distance based demonstration mechanism with an effective test, demonstration, and trail mechanism for new applications, services, and products. The navigation system 100 utilizes distance to limit test, demonstration, or trial periods. The distance measuring and monitoring more accurately reflects active usage as opposed to inactive usage that may be considered under other test, demonstration, or trial mechanisms. By limiting the distance bounded function 224 through the use of the distance limit 222 the navigation system 100 prevents the demonstration period from being shortened by periods when the navigation system 100 is not in active use or is sitting idle, such as when the navigation system 100 is in a vehicle at a stop light.

Using the distance traveled 220 to determine the length of the demonstration of the distance bounded function 224 the navigation system 100 also helps to ensure that the demonstration is of sufficient length to allow users to fully experience the distance bounded function 224. The use the distance traveled 220, for example, avoids the waste of the demonstration period by unforeseen circumstances such as traffic that would occur under other test, demonstration or trial mechanisms, such as a time limited demonstration period.

Furthermore, by only measuring the distance traveled 220 while the distance bounded function 224 is being executed the navigation system 100 ensures that the demonstration period of the distance bounded function 224 is not being consumed when the user is not actually experiencing the distance bounded function 224. In addition, the distance based demonstration mechanism allows the navigation system 100 to provide a demonstration of the distance bounded function 224 without having to limit the functionality of the distance bounded function 224 in any way. The navigation system 100 has many advantages over time or functionality limited demonstration modes including ensuring that users have sufficient time to fully experience a function, application, service or product before buying it and ensuring that vendors are able to fully demonstrate the function, application, service or product to customers.

Figure 3:
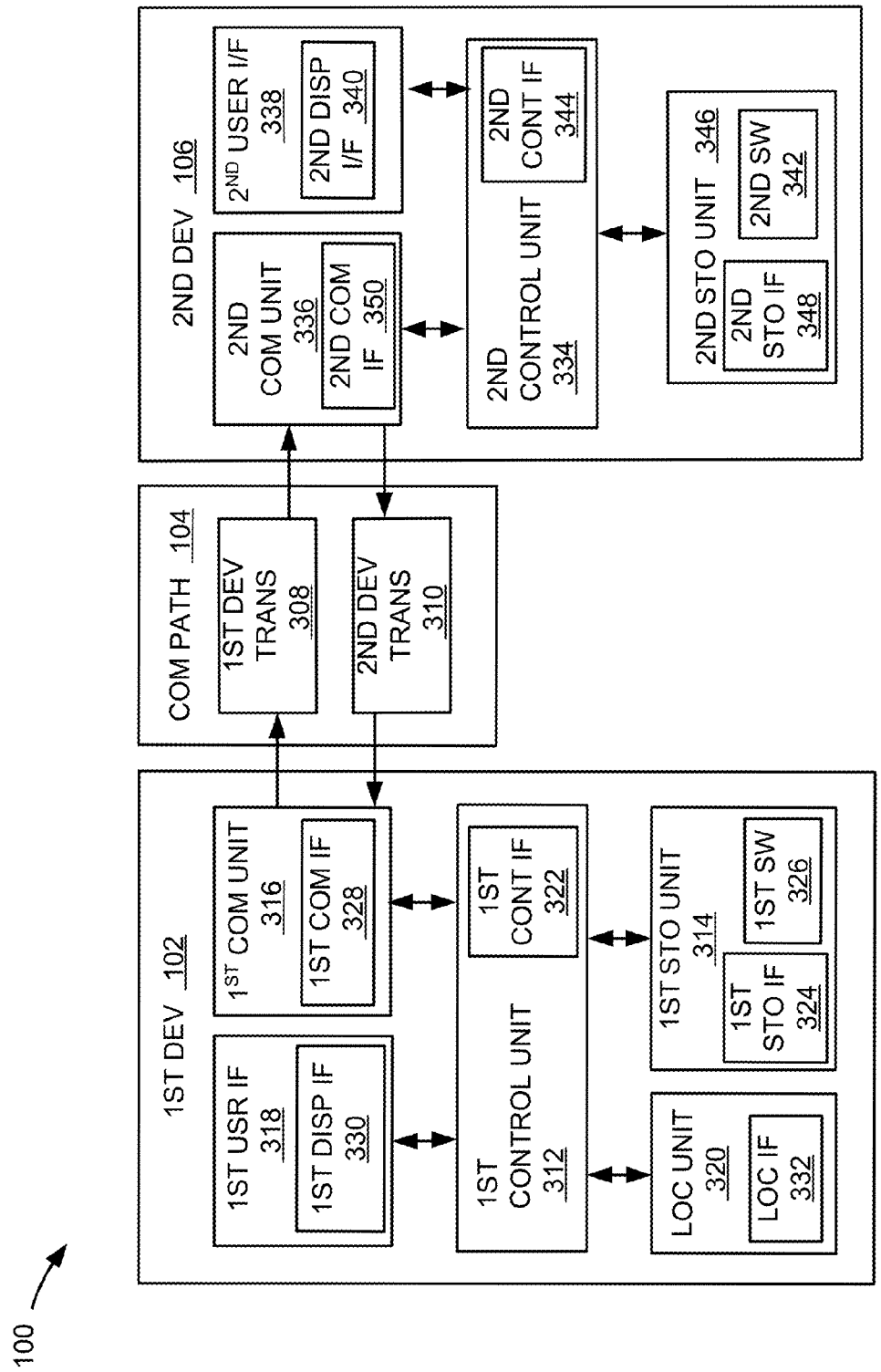
FIG. 3 is an exemplary block diagram of the navigation system.

Referring now to FIG. 3, therein is shown an exemplary block diagram of the navigation system 100. The navigation system 100 can include the first device 102, the communication path 104, and the second device 106. The first device 102 can send information in a first device transmission 308 over the communication path 104 to the second device 106. The second device 106 can send information in a second device transmission 310 over the communication path 104 to the first device 102.

For illustrative purposes, the navigation system 100 is shown with the first device 102 as a client device, although it is understood that the navigation system 100 can have the first device 102 as a different type of device. For example, the first device 102 can be a server.

Also for illustrative purposes, the navigation system 100 is shown with the second device 106 as a server, although it is understood that the navigation system 100 can have the second device 106 as a different type of device. For example, the second device 106 can be a client device.

For brevity of description in this embodiment of the present invention, the first device 102 will be described as a client device and the second device 106 will be described as a server device. The present invention is not limited to this selection for the type of devices. The selection is an example of the present invention.

The first device 102 can include a first control unit 312, a first storage unit 314, a first communication unit 316, a first user interface 318, and a location unit 320. The first device 102 can be similarly described by the first device 102.

The first control unit 312 can include a first control interface 322. The first control unit 312 can execute a first software 326 to provide the intelligence of the navigation system 100. The first control unit 312 can be implemented in a number of different manners. For example, the first control unit 312 can be a processor, an embedded processor, a microprocessor, a hardware control logic, a hardware finite state machine (FSM), a digital signal processor (DSP), or a combination thereof. The first control interface 322 can be used for communication between the first control unit 312 and other functional units in the first device 102. The first control interface 322 can also be used for communication that is external to the first device 102.

The first control interface 322 can receive information from the other functional units or from external sources, or can transmit information to the other functional units or to external destinations. The external sources and the external destinations refer to sources and destinations external to the first device 102.

The first control interface 322 can be implemented in different ways and can include different implementations depending on which functional units or external units are being interfaced with the first control interface 322. For example, the first control interface 322 can be implemented with a pressure sensor, an inertial sensor, a microelectromechanical system (MEMS), optical circuitry, waveguides, wireless circuitry, wireline circuitry, or a combination thereof.

The location unit 320 can generate location information, current heading, and current speed of the first device 102, as examples. The location unit 320 can be implemented in many ways. For example, the location unit 320 can function as at least a part of a global positioning system (GPS), an inertial navigation system, a cellular-tower location system, a pressure location system, or any combination thereof.

The location unit 320 can include a location interface 332. The location interface 332 can be used for communication between the location unit 320 and other functional units in the first device 102. The location interface 332 can also be used for communication that is external to the first device 102.

The location interface 332 can receive information from the other functional units or from external sources, or can transmit information to the other functional units or to external destinations. The external sources and the external destinations refer to sources and destinations external to the first device 102.

The location interface 332 can include different implementations depending on which functional units or external units are being interfaced with the location unit 320. The location interface 332 can be implemented with technologies and techniques similar to the implementation of the first control interface 322.

The first storage unit 314 can store the first software 326. The first storage unit 314 can also store the relevant information, such as advertisements, points of interest (POI), navigation routing entries, or any combination thereof.

The first storage unit 314 can be a volatile memory, a nonvolatile memory, an internal memory, an external memory, or a combination thereof. For example, the first storage unit 314 can be a nonvolatile storage such as non-volatile random access memory (NVRAM), Flash memory, disk storage, or a volatile storage such as static random access memory (SRAM).

The first storage unit 314 can include a first storage interface 324. The first storage interface 324 can be used for communication between the location unit 320 and other functional units in the first device 102. The first storage interface 324 can also be used for communication that is external to the first device 102.

The first storage interface 324 can receive information from the other functional units or from external sources, or can transmit information to the other functional units or to external destinations. The external sources and the external destinations refer to sources and destinations external to the first device 102.

The first storage interface 324 can include different implementations depending on which functional units or external units are being interfaced with the first storage unit 314. The first storage interface 324 can be implemented with technologies and techniques similar to the implementation of the first control interface 322.

The first communication unit 316 can enable external communication to and from the first device 102. For example, the first communication unit 316 can permit the first device 102 to communicate with the second device 106 of FIG. 1, an attachment, such as a peripheral device or a computer desktop, and the communication path 104.

The first communication unit 316 can also function as a communication hub allowing the first device 102 to function as part of the communication path 104 and not limited to be an end point or terminal unit to the communication path 104. The first communication unit 316 can include active and passive components, such as microelectronics or an antenna, for interaction with the communication path 104.

The first communication unit 316 can include a first communication interface 328. The first communication interface 328 can be used for communication between the first communication unit 316 and other functional units in the first device 102. The first communication interface 328 can receive information from the other functional units or can transmit information to the other functional units.

The first communication interface 328 can include different implementations depending on which functional units are being interfaced with the first communication unit 316. The first communication interface 328 can be implemented with technologies and techniques similar to the implementation of the first control interface 322.

The first user interface 318 allows a user (not shown) to interface and interact with the first device 102. The first user interface 318 can include an input device and an output device. Examples of the input device of the first user interface 318 can include a keypad, a touchpad, soft-keys, a keyboard, a microphone, or any combination thereof to provide data and communication inputs.

The first user interface 318 can include a first display interface 330. The first display interface 330 can include a display, a projector, a video screen, a speaker, or any combination thereof.

The first control unit 312 can operate the first user interface 318 to display information generated by the navigation system 100. The first control unit 312 can also execute the first software 326 for the other functions of the navigation system 100, including receiving location information from the location unit 320. The first control unit 312 can further execute the first software 326 for interaction with the communication path 104 via the first communication unit 316.

The second device 106 can be optimized for implementing the present invention in a multiple device embodiment with the first device 102. The second device 106 can provide the additional or higher performance processing power compared to the first device 102. The second device 106 can include a second control unit 334, a second communication unit 336, and a second user interface 338.

The second user interface 338 allows a user (not shown) to interface and interact with the second device 106. The second user interface 338 can include an input device and an output device. Examples of the input device of the second user interface 338 can include a keypad, a touchpad, soft-keys, a keyboard, a microphone, or any combination thereof to provide data and communication inputs. Examples of the output device of the second user interface 338 can include a second display interface 340. The second display interface 340 can include a display, a projector, a video screen, a speaker, or any combination thereof.

The second control unit 334 can execute a second software 342 to provide the intelligence of the second device 106 of the navigation system 100. The second software 342 can operate in conjunction with the first software 326. The second control unit 334 can provide additional performance compared to the first control unit 312.

The second control unit 334 can operate the second user interface 338 to display information. The second control unit 334 can also execute the second software 342 for the other functions of the navigation system 100, including operating the second communication unit 336 to communicate with the first device 102 over the communication path 104.

The second control unit 334 can be implemented in a number of different manners. For example, the second control unit 334 can be a processor, an embedded processor, a microprocessor, a hardware control logic, a hardware finite state machine (FSM), a digital signal processor (DSP), or a combination thereof.

The second control unit 334 can include a second controller interface 344. The second controller interface 344 can be used for communication between the second control unit 334 and other functional units in the second device 106. The second controller interface 344 can also be used for communication that is external to the second device 106.

The second controller interface 344 can receive information from the other functional units or from external sources, or can transmit information to the other functional units or to external destinations. The external sources and the external destinations refer to sources and destinations external to the second device 106.

The second controller interface 344 can be implemented in different ways and can include different implementations depending on which functional units or external units are being interfaced with the second controller interface 344. For example, the second controller interface 344 can be implemented with a pressure sensor, an inertial sensor, a microelectromechanical system (MEMS), optical circuitry, waveguides, wireless circuitry, wireline circuitry, or a combination thereof.

A second storage unit 346 can store the second software 342. The second storage unit 346 can also store the relevant information, such as advertisements, points of interest (POI), navigation routing entries, or any combination thereof. The second storage unit 346 can be sized to provide the additional storage capacity to supplement the first storage unit 314.

For illustrative purposes, the second storage unit 346 is shown as a single element, although it is understood that the second storage unit 346 can be a distribution of storage elements. Also for illustrative purposes, the navigation system 100 is shown with the second storage unit 346 as a single hierarchy storage system, although it is understood that the navigation system 100 can have the second storage unit 346 in a different configuration. For example, the second storage unit 346 can be formed with different storage technologies forming a memory hierarchal system including different levels of caching, main memory, rotating media, or off-line storage.

The second storage unit 346 can be a volatile memory, a nonvolatile memory, an internal memory, an external memory, or a combination thereof. For example, the second storage unit 346 can be a nonvolatile storage such as nonvolatile random access memory (NVRAM), Flash memory, disk storage, or a volatile storage such as static random access memory (SRAM).

The second storage unit 346 can include a second storage interface 348. The second storage interface 348 can be used for communication between the location unit 320 and other functional units in the second device 106. The second storage interface 348 can also be used for communication that is external to the second device 106.

The second storage interface 348 can receive information from the other functional units or from external sources, or can transmit information to the other functional units or to external destinations. The external sources and the external destinations refer to sources and destinations external to the second device 106.

The second storage interface 348 can include different implementations depending on which functional units or external units are being interfaced with the second storage unit 346. The second storage interface 348 can be implemented with technologies and techniques similar to the implementation of the second controller interface 344.

The second communication unit 336 can enable external communication to and from the second device 106. For example, the second communication unit 336 can permit the second device 106 to communicate with the first device 102 over the communication path 104.

The second communication unit 336 can also function as a communication hub allowing the second device 106 to function as part of the communication path 104 and not limited to be an end point or terminal unit to the communication path 104. The second communication unit 336 can include active and passive components, such as microelectronics or an antenna, for interaction with the communication path 104.

The second communication unit 336 can include a second communication interface 350. The second communication interface 350 can be used for communication between the second communication unit 336 and other functional units in the second device 106. The second communication interface 350 can receive information from the other functional units or can transmit information to the other functional units.

The second communication interface 350 can include different implementations depending on which functional units are being interfaced with the second communication unit 336. The second communication interface 350 can be implemented with technologies and techniques similar to the implementation of the second controller interface 344.

The first communication unit 316 can couple with the communication path 104 to send information to the second device 106 in the first device transmission 308. The second device 106 can receive information in the second communication unit 336 from the first device transmission 308 of the communication path 104.

The second communication unit 336 can couple with the communication path 104 to send information to the first device 102 in the second device transmission 310. The first device 102 can receive information in the first communication unit 316 from the second device transmission 310 of the communication path 104. The navigation system 100 can be executed by the first control unit 312, the second control unit 334, or a combination thereof.

For illustrative purposes, the second device 106 is shown with the partition having the second user interface 338, the second storage unit 346, the second control unit 334, and the second communication unit 336, although it is understood that the second device 106 can have a different partition. For example, the second software 342 can be partitioned differently such that some or all of its function can be in the second control unit 334 and the second communication unit 336. Also, the second device 106 can include other functional units not shown in FIG. 3 for clarity.

The functional units in the first device 102 can work individually and independently of the other functional units. The first device 102 can work individually and independently from the second device 106 and the communication path 104.

The functional units in the second device 106 can work individually and independently of the other functional units. The second device 106 can work individually and independently from the first device 102 and the communication path 104.

For illustrative purposes, the navigation system 100 is described by operation of the first device 102 and the second device 106. It is understood that the first device 102 and the second device 106 can operate any of the modules and functions of the navigation system 100. For example, the first device 102 is described to operate the location unit 320, although it is understood that the second device 106 can also operate the location unit 320.

Figure 4:
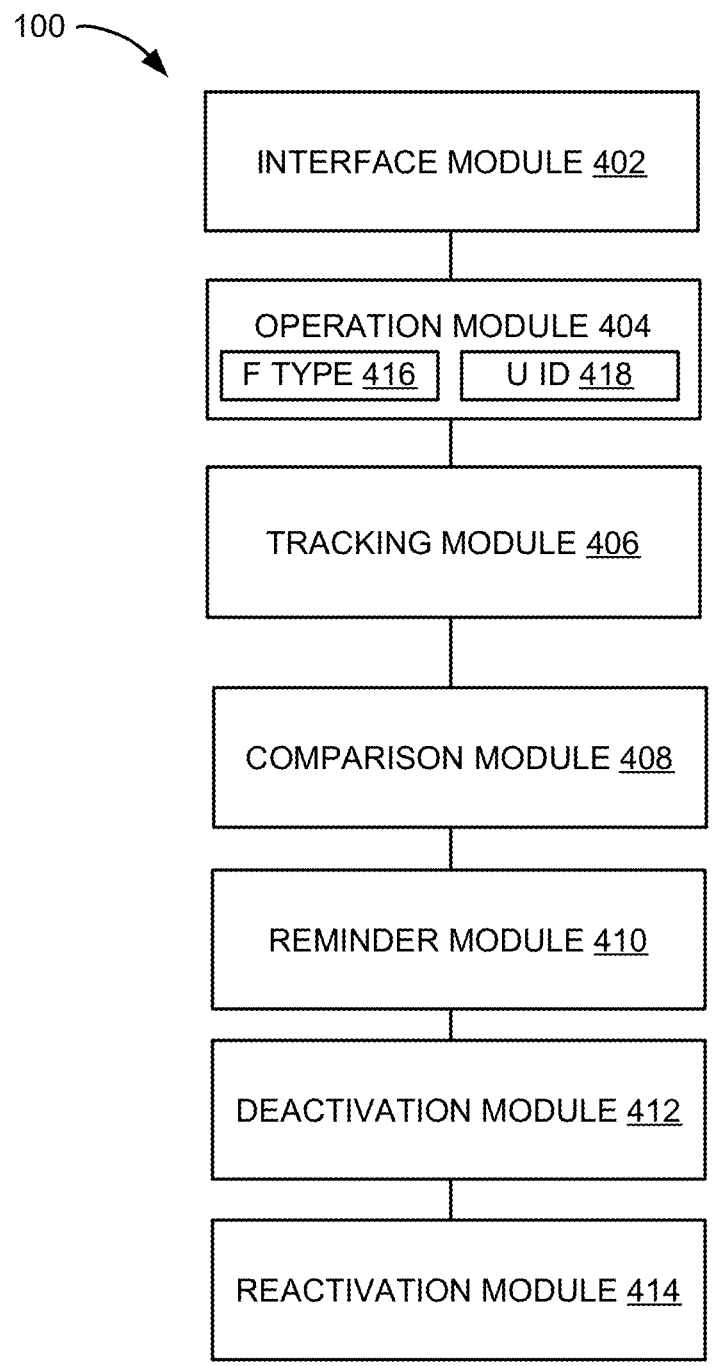
FIG. 4 is a flow of the navigation system.

Referring now to FIG. 4, therein is shown a flow of the navigation system 100. The navigation system 100 depicts an interface module 402, which includes input and output functions for receiving and sending information, such as receiving the purchase code 226 of FIG. 2 or selecting applications, services, or products. The interface module 402 can receive an input including, for example, the destination 214 of FIG. 2, a store name, an address, a store type, a movie name, or other relevant information. For example, the destination 214 can be "Kifer Road and Lawrence Expressway in Sunnyvale, Calif." The interface module 402 can also receive an input such as the selection of the distance bounded function 224 of FIG. 2.

The interface module 402 can be implemented, for example, by the first device 102 of FIG. 1, the second device 106, or distributed between the two. For example the interface module 402 can be implemented by the first communication unit 316 of FIG. 3 or the second communication unit 336 of FIG. 3 receiving the input. The first control unit 312 of FIG. 3 or the second control unit 334 of FIG. 3 can process the input. The first software 326 of FIG. 3 or the second software 342 of FIG. 3 can provide the intelligence for the interface module 402.

The navigation system 100 further depicts an operation module 404 for executing the distance bounded function 224 of FIG. 2. The operation module 404 can execute the distance bounded function 224 which can be defined as an operation carried out by the navigation system 100 that is provided in a distance limited demonstration mode.

The distance bounded function 224 can be, for example, a navigation function, application, or service or a non-navigation function, application, or service, a location based function, application or service, an entertainment function, application or service, a news function, application or service, a tracking function, application or service or a shopping function, application or service. As a further example, the distance bounded function 224 can also be a function, application or service that provides maps and route information, provides traffic alerts, delivers movie times, allows a user to purchase a product, provides restaurant reviews and recommendations, provides news, provides sports news and scores, allows a user to watch video content, allows a user listen to audio content, allows a user to track other people, or allows a user to use a heads up display.

The distance bounded function 224 executed by the operation module 404 can include a number of feature types 416. The feature types 416 is defined as functional components of the distance bounded function 224 that can be controlled individually from each other or from the distance bounded function 224 as a whole. For example, the operation module 404 can execute the distance bounded function 224 that is designed for use during driving only as one of the feature types 416. For example, the distance bounded function 224 can be designed to provide driving directions as another example of one of the feature types 416. The operation module 404 can also execute the distance bounded function 224 that is designed for use during any transportation mode, such as driving, flying, boating or riding public transportation, or for use by pedestrians or equestrians, as a further example of the feature types 416.

The operation module 404 can further execute the distance bounded function that is designed to provide a location based service, such as finding the nearest restaurant or automatic teller machine (ATM), or locating a person. The operation module 404 can also execute the distance bounded function 224 that is designed to provide security. For example, the distance bounded function 224 can be designed to deactivate the navigation system 100 or to begin transmitting the location of the navigation system 100 to law enforcement if the navigation system 100 is reported stolen.

The operation module 404 can also execute the distance bounded function 224 separately for each user of the navigation system 100 based on a user identification 418 for each user. The user identification 418 is defined as a unique identifier for each user of the distance bounded function 224. For example, a first user (not shown) may have access to the distance bounded function 224 through the use of the user identification 418, such as a user name and password or the use of an access code.

A second user (not shown) can have access to the navigation system 100 but may not have access to the distance bounded function 224. Similarly, for example, the second user may have access to the distance bounded function 224 that is different from the distance bounded function 224 that is accessible to the first user. In addition, all users of the navigation system 100 can have access to the distance bounded function 224 without the use of user names, passwords, or access codes.

The operation module 404 can execute the distance bounded function 224 that is provided remotely, such as by the second device 106 of FIG. 1, in a client-server configuration. The operation module 404 can execute the distance bounded function 224 provided remotely, either with or without the use of a username and a password. This can be useful where the distance bounded function 224 is, for example, being demonstrated on a device that is incapable of executing the distance bounded function 224 itself or where the user wants to test the distance bounded function 224 before downloading it. The operation module 404 can also execute the distance bounded function 224 that is provided locally, such as by the first device 102.

The operation module 404 can be implemented, for example, by the first device 102 of FIG. 1, the second device 106 of FIG. 1, or distributed between the two. For example, the operation module 404 can be implemented by the first control unit 312 or the second control unit 334 executing the distance bounded function 224. The first software 326 or the second software 342 can provide the intelligence for the operation module 404.

The navigation system 100 further depicts a tracking module 406 for measuring the distance traveled 220 from the reference location 218. The tracking module 406 can measure the distance traveled 220, for example, from the reference location 218 to the user location 212. The distance traveled 220 can be an aggregate of the distance traveled 220 each time the distance bounded function 224 is executed. The distance traveled 220 can be measured in, for example feet, yards, miles, meters, or kilometers. The distance traveled 220 can also be measured, for example, measuring a linear distance, a radius, or by measuring changes in height or altitude. The distance traveled 220 can also be measured by tracking the crossing of the geographic boundary such as a border of a state, a town, a city, a county, a park or an vendor determined area.

The tracking module 406 can include a number of modules for performing the functions of the tracking module 406. The names and functions of these modules will be discussed in detail in the discussion of FIG. 5.

The tracking module 406 can be implemented, for example, by the first device 102 of FIG. 1, the second device 106 of FIG. 1, or distributed between the two. For example, the tracking module 406 can be implemented by the location unit 320 of FIG. 3 determining the user location 212. The first control unit 312 or the second control unit 334 can set the reference location 218 and can calculate the distance traveled 220. The first software 326 or the second software 342 can provide the intelligence for the tracking module 406.

The navigation system 100 further depicts a comparison module 408 that compares the distance limit 222 to the distance traveled 220 to determine if the distance traveled 220 meets or exceeds the distance limit 222. The distance limit 222 can be a limit set by the manufacturer or vendor of the navigation system 100 or of the distance bounded function 224. The distance limit 222 can be a limit that is set in terms of, for example, a linear value, a radial value, feet, yards, miles, meters, kilometers, height, or altitude. The distance limit 222 can also be a limit based on the geographic boundary such as a border of a state, a town, a city, a county, a park or a vendor determined area.

If the comparison module 408 determines that the distance traveled 220 is equal to or exceeds the distance limit 222 then it can send an instruction to a deactivation module 412 to deactivate the distance bounded function 224 of the navigation system 100 with the deactivation function 221 of FIG. 2. The comparison module 408 can also send an instruction to the deactivation module 412 to deactivate the navigation system 100. If the comparison module 408 determines that the purchase code 226 has been received before the distance traveled 220 is equal to the distance limit 222 then the tracking module 406 can remove the distance limit 222 for the distance bounded function 224.

The comparison module 408 can process the distance limit 222 separately for each type of the distance bounded function 224 executed by the operation module 404. For example the distance limit 222 for the distance bounded function 224 that is designed for providing driving directions can be compared to the distance traveled 220 that was measured while running the distance bounded function 224 that is designed for provided driving directions. The comparison module 408 can separately compare the distance limit 222 for the distance bounded function 224 that is designed to provide movie times to the distance traveled 220 that was measured while running the distance bounded function 224 that is designed to provide movie times.

The comparison module 408 can also send an instruction to the deactivation module 412 to deactivate each type of the distance bounded function 224 either separately or together. For example the distance limit 222 for the distance bounded function 224 designed to provide directions to pedestrians may be reached before the distance limit 222 for the distance bounded function 224 designed to track people is reached. In such a case the comparison module 408 can send an instruction to deactivate the distance bounded function 224 designed to provide directions to pedestrians while the distance bounded function 224 designed to track other users continues to operate.

The comparison module 408 can be implemented, for example, by the first device 102 of FIG. 1, the second device 106 of FIG. 1, or distributed between the two. For example, the comparison module 408 can be implemented by the first control unit 312 or the second control unit 334 comparing the distance limit 222 to the distance traveled 220. The first control interface 322 of FIG. 3 or the second controller interface 344 of FIG. 3 can send an instruction to the deactivation module 412 and can determine if the purchase code 226 has been received. The first software 326 or the second software 342 can provide the intelligence for the tracking module 406.

The navigation system 100 further depicts a reminder module 410 that generates the reminder 216 of FIG. 2 to convey information to the user (not shown) of the navigation system 100. The reminder 216 can convey information about the distance limit 222 and the distance traveled 220. For example, the reminder 216 can be a reminder of the distance limit 222, the distance traveled 220, the difference between the distance limit 222 and the distance traveled 220, or a reminder that a certain distance from the distance limit 222 has been reached.

The reminder 216 can also convey information no directly related to the distance limit 222 or the distance traveled 220. For example the reminder 216 can be a reminder that the navigation system 100 is running the distance bounded function 224, a reminder to purchase the purchase code 226, or a message informing the user that the distance bounded function 224 is deactivated.

The reminder 216 can be generated when a specific event occurs, such as when the distance traveled 220 equals a predetermined amount or when the user, has traveled within a predetermined distance of the distance limit 222. The reminder 216 can also be generated at a regular interval. The reminder 216 can be displayed on, for example, the display interface 202 of FIG. 2. Additionally, the reminder 216 can be delivered as an audio prompt, a multimedia prompt, or a physical motion prompt such as a vibration, or a combination thereof.

The reminder module 410 can be implemented, for example, by the first device 102 of FIG. 1, the second device 106 of FIG. 1, or distributed between the two. For example, the reminder module 410 can be implemented by the first control unit 312 or the second control unit 334 generating the reminder 216. The first software 326 or the second software 342 can provide the intelligence for the deactivation module 412.

The navigation system 100 further depicts the deactivation module 412 that can deactivate the distance bounded function 224 of the navigation system 100 when it receives an instruction to do so from the comparison module 408. The deactivation module 412 can deactivate the distance bounded function 224 so that it is not usable by the user of the navigation system 100 or so that it is only partially usable. The deactivation module 412 can also deactivate the navigation system 100.

The deactivation module 412 can also send an instruction to another device, such as the second device 106, to deactivate the distance bounded function 224 being carried out by the second device 106 when the distance traveled 220 meets or exceeds the distance limit 222. This can be used when the distance bounded function 224 is, for example, being demonstrated on a device that is incapable of executing the distance bounded function 224 itself or where the user wants to test the distance bounded function 224 before downloading it.

The deactivation module 412 can be implemented, for example, by the first device 102 of FIG. 1, the second device 106 of FIG. 1, or distributed between the two. For example, the deactivation module 412 can be implemented by the first communication unit 316 or the second communication unit 336 receiving an instruction to deactivate the distance bounded function 224. The first control unit 312 or the second control unit 334 can process the instruction to deactivate the distance bounded function 224. The first software 326 or the second software 342 can provide the intelligence for the deactivation module 412.

The navigation system 100 further depicts a reactivation module 414 for reactivating the distance bounded function 224 that has been deactivated. The reactivation module 414 can receive the purchase code 226. If the purchase code 226 is received then the reactivation module 414 can reactivate the distance bounded function 224 or the navigation system 100 that was deactivated to remove the distance limit 222 for the distance bounded function 224 or the navigation system 100.

The reactivation module 414 can also receive the extension code 228 of FIG. 2. When the reactivation module 414 receives the extension code 228 the reactivation module 414 can temporarily reactivate the distance bounded function 224 or the navigation system 100. The reactivation module 414 can temporarily reactivate the distance bounded function 224, for example, by increasing the value of the distance limit 222 or by resetting or lowering the distance traveled 220 when the extension code 228 is received.

Temporary reactivation of the distance bounded function 224 or the navigation system 100 can be useful, for example, for the user that wants to further experience the distance bounded function 224 without purchasing the distance bounded function 224. The user can further purchase a further demonstration of the distance bounded function 224 by obtaining and entering the extension code 228 to temporarily reactivate the distance bounded function 224. Also, for example, the extension code 228 can be used where a vendor of the distance bounded function 224 does not want to make permanent reactivation an option for the distance bounded function 224.

The reactivation module 414 can also send an instruction to another device, such as the second device 106, to permanently or temporarily reactivate the distance bounded function 224 being carried out by the second device 106 when the reactivation module 414 receives the purchase code 226 or the extension code 228. This can be used when the distance bounded function 224 is, for example, being demonstrated on a device that is incapable of executing the distance bounded function 224 itself or where the user wants to test the distance bounded function 224 before downloading it.

The reactivation module 414 can be implemented, for example, by the first device 102 of FIG. 1, the second device 106 of FIG. 1, or distributed between the two. For example, the reactivation module 414 can be implemented by the first communication unit 316 or the second communication unit 336 receiving an instruction to reactivate the distance bounded function 224. The first control unit 312 or the second control unit 334 can process the instruction to reactivate the distance bounded function 224. The first software 326 or the second software 342 can provide the intelligence for the reactivation module 414.

The navigation system 100 describes the module functions or order as an example. The modules can be partitioned differently. For example the operation module 404 can perform the functions of the tracking module 406 or the deactivation module 412 can perform the functions of the operation module 404. Each of the modules can operate individually and independently of the other modules.

The navigation system 100 can be partitioned between the first device 102 of FIG. 3 and the second device 106 of FIG. 3. For example, the navigation system 100 can be partition into the functional units of the first device 102, the second device 106, or a combination thereof. The navigation system 100 can also be implemented as additional functional units in the first device 102 of FIG. 1, the first device 102, the second device 106, or a combination thereof.

Figure 5:
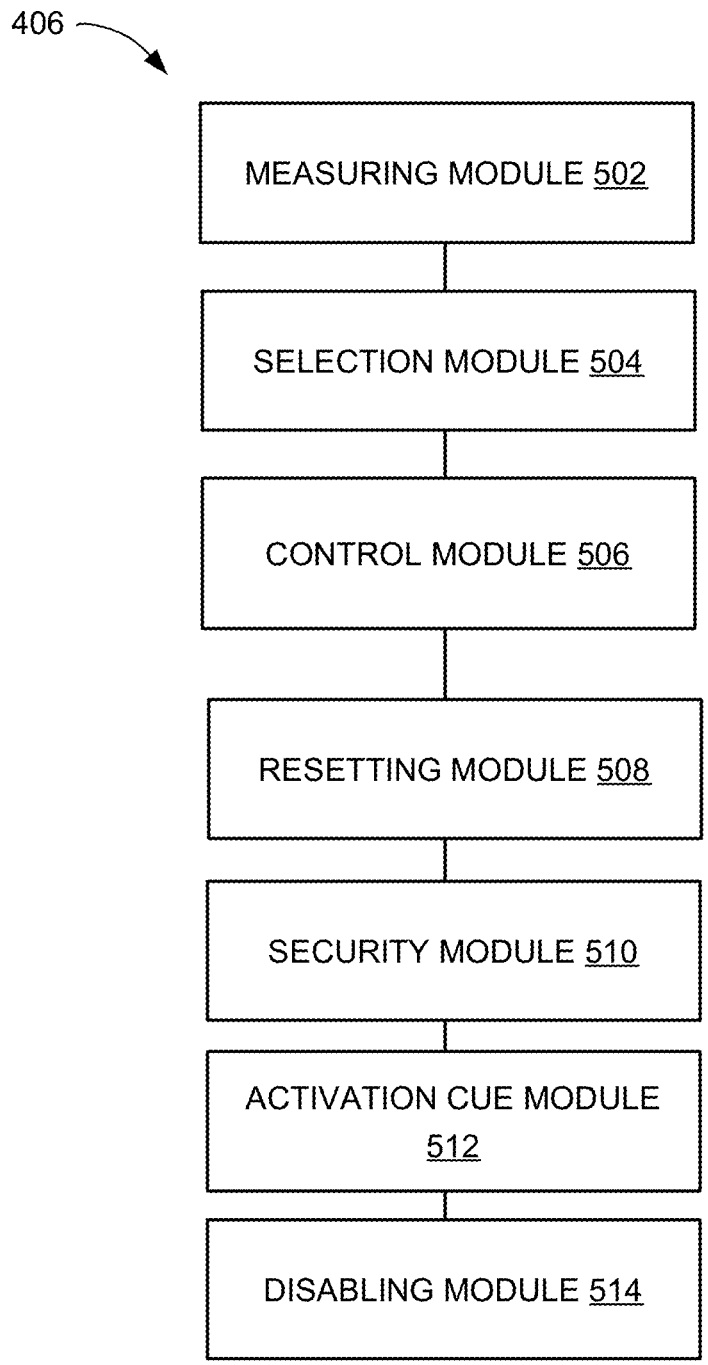
FIG. 5 is a more detailed view of the tracking module of FIG. 4.

Referring now to FIG. 5, therein is shown a more detailed view of the tracking module 406 of FIG. 4. The tracking module 406 can include a measuring module 502 for measuring the distance traveled 220 of FIG. 2. The measuring module 502 measures the distance traveled 220, for example, from the reference location 218 of FIG. 2 to the user location 212 of FIG. 2, when the distance bounded function 224 of FIG. 2 is executed. The distance traveled 220 can be an aggregate of the distance traveled 220 each time the distance bounded function 224 is executed. The measuring module 502 can measure the distance traveled 220 per feature type.

The measuring module 502 can measure the distance traveled 220 in, for example feet, yards, miles, meters, or kilometers. The distance traveled 220 can also be measured, for example, by measuring a linear distance, a radius or by measuring changes in height or altitude. The distance traveled 220 can also be measured by tracking the crossing into or out of a geographic boundary such as a border of a state, a town, a city, a county, a park or an vendor determined area.

The measuring module 502 can measure the distance traveled 220 for each type of the distance bounded function 224 executed by the operation module 404 of FIG. 4. The measuring module 502 can measure the distance traveled 220 separately for each type of the distance bounded function 224. For example the distance traveled 220 for the distance bounded function 224 that is designed for providing driving directions can be measured separately from the distance traveled 220 for the distance bounded function 224 that is designed to provide movie times.

The measuring module 502 can also measure the distance traveled 220 for any of types of the distance bounded function 224 of the navigation system 100 of FIG. 4 all together. For example, the distance traveled 220 can be an aggregate of the distance traveled 220 measured when either the distance bounded function 224 that is designed for providing driving directions or the distance bounded function 224 that is designed to provide movie times is being executed.

The measuring module 502 can also measure the distance traveled 220 based on the user of the navigation system 100. For example, the measuring module 502 can measure the distance traveled 220 separately for each user of the navigation system. For example, if a first user (not shown) logs onto the navigation system 100 then the measuring module 502 can measure the distance traveled 220 for the first user while the first user in logged on.

The measuring module 502 can keep track of the distance traveled 220 that accrues each time the first user is logged on to the navigation system 100. If a second user (not shown) logs onto the navigation system 100 then the measuring module 502 can track the distance traveled 220 by the second user separately from the distance traveled 220 by the first user. It is understood, however, that the measuring module 502 can also keep track of the distance traveled 220 every time the distance bounded function 224 is executed regardless of which user is using the navigation system 100.

The measuring module 502 can be implemented, for example, by the first device 102 of FIG. 1, the second device 106 of FIG. 1, or distributed between the two. For example, the measuring module 502 can be implemented by the location unit 320 of FIG. 3 determining the user location 212. The first control unit 312 of FIG. 3 or the second control unit 334 of FIG. 3 can determine which of the distance bounded function 224 or which user to calculate the distance traveled 220 for and can calculate the distance traveled 220. The first software 326 of FIG. 3 or the second software 342 of FIG. 3 can provide the intelligence for the measuring module 502.

The tracking module 406 can include a selection module 504 for determining the method of measuring the distance traveled 220 for the distance bounded function 224. The selection module 504 can, for example, determine how to measure the distance traveled 220 based on the distance limit 222 of FIG. 2. The distance limit 222 can be a limit set by the manufacturer or vendor of the navigation system 100 or of the distance bounded function 224. The distance limit 222 can be a limit that is set in terms of, for example, a linear value or a radial value measure in units of feet, yards, miles, meters, or kilometers. The distance limit 222 can also be a limit based on the geographic boundary such as a border of a state, a town, a city, a county, a park or a vendor determined area.

If the distance limit 222 is, for example, set in miles then the selection module 504 can determine that a distance measured 219 should be measured in miles. Likewise, if the distance limit 222 is set as a geographic boundary the selection module 504 can determine that the distance measured 219 should be measured in terms of the geographic boundary set by the distance limit 222. This can help the navigation system 100 to avoid unnecessary unit conversions that could be necessary, for example, if the distance limit 222 is set in kilometers but the distance traveled 220 is measured in feet. This can also help the navigation system 100 to avoid difficult comparison problems such as, for example, where the distance limit 222 is set as a geographic boundary, but the distance traveled 220 is measured in miles.

The selection module 504 can also set the reference location 218. The reference location 218 can be set by the selection module 504 based on the type of the distance limit 222 in order to ensure that the comparison of the distance limit 222 to the distance traveled 220 is meaningful. For example, if the distance limit 222 is a linear value set in miles, then the selection module 504 can set the location of the user when the distance bounded function 224 is started as the reference location 218. As another example, if the distance limit 222 is a geographic boundary then the selection module 504 can set the reference location 218 as the center of the area inside the geographic boundary.

The selection module 504 can be implemented, for example, by the first device 102 of FIG. 1, the second device 106 of FIG. 1, or distributed between the two. For example, the selection module 504 can be implemented by the location unit 320 determining the user location 212. The first control unit 312 or the second control unit 334 can determine how to measure the distance traveled 220 based on the distance limit 222 and set the reference location 218. The first software 326 or the second software 342 can provide the intelligence for the selection module 504.

The tracking module 406 can also include a control module 506 for determining when to start, pause, or stop measuring the distance traveled 220. The control module 506 can determine to start measuring the distance traveled 220, for example, only when the distance bounded function 224 is being executed in order to avoid measuring the distance traveled 220 when the user is not actively using the distance bounded function 224.

For example, the tracking module 406 can refrain from measuring the distance traveled 220 whenever a function other than the distance bounded function 224 is being executed and the distance bounded function 224 is not being executed. By doing this the control module 506 can help to ensure that the distance traveled 220 only increases in value when the user is actually operating out the distance bounded function 224.

As another example, the control module 506 can determine to start measuring the distance traveled 220, for example, when the user exits or enters the reference location 218 or generally referred to as a geographic boundary. For example, a car dealer wants to demonstrate the distance bounded function 224 to a customer and the control module 506 can determine to start measuring only after the user has exited the car lot. By doing this the control module 506 can prevent the distance traveled 220 from being measured when the distance bounded function 224 is not being meaningfully demonstrated, such as when the navigation system 100 is travelling in a vehicle being moved from the back of a car lot to the front or is travelling in a vehicle being returned to its parking space.

The control module 506 can also measure the distance traveled 220 any time the navigation system 100 is running, regardless of whether or not the distance bounded function 224 is being executed.

The control module 506 can also determine to pause measuring the distance traveled 220 by temporarily ceasing measuring the distance traveled 220. The control module 506 can determine to pause measuring the distance traveled 220 when, for example, the distance bounded function 224 stops being executed or when a geographic boundary has been crossed.

For example, the control module 506 can determine to pause measuring the distance traveled 220 when the users exits or enters a geographic boundary. As an example, the control module 506 can determine to pause measuring the distance traveled 220 when the user enters the car lot of a car dealership. The control module 506 can also determine to pause measuring the distance traveled 220 when the distance bounded function 224 was being executed, but is stopped. By doing this the control module 506 prevent the distance traveled 220 from being measured when the distance bounded function 224 is not being meaningfully demonstrated, for example, where the navigation system 100 is travelling in a vehicle but the distance bounded function 224 is not being executed.

The control module 506 can also determine to stop measuring the distance traveled 220, by ceasing to measured the distance traveled 220 beyond a duration for a pause. The control module 506 can determine to stop measuring the distance traveled 220 when, for example, the purchase code 226 has been received or when the disabling code 230 of FIG. 2 has been received. For example, the control module 506 can determine to permanently stop measuring the distance traveled 220 for the distance bounded function 224 when the purchase code 226 has been received. When the disabling code 230 has been received, the control module 506 can determine to stop measuring the distance traveled 220 for the distance bounded function 224 until the user logs off, ends the distance bounded function 224, or enters an instruction cancelling the disabling code 230.

The control module 506 can be implemented, for example, by the first device 102, the second device 106, or distributed between the two. For example, the control module 506 can be implemented by the location unit 320 determining the user location 212. The first control unit 312 or the second control unit 334 can determine that measuring the distance traveled 220 should be started, paused or stopped. The first software 326 or the second software 342 can provide the intelligence for the control module 506.

The tracking module 406 can further include a resetting module 508 for determining when to reset the distance traveled 220, meaning setting the distance traveled 220 back to zero or back to a previous value. The resetting module 508 can determine that the distance traveled 220 should be reset, for example, when the extension code 228 has been received or when a new user is added to the navigation system 100. For example, when the extension code 228 has been received the resetting module 508 can reset the distance traveled 220 to zero or some previous value allowing the distance bounded function 224 to be further demonstrated.

The resetting module 508 can also reset the distance limit 222 when a new user is added to the navigation system 100. For example, if the navigation system 100 has a set number of users the distance limit 222 can reset the distance traveled 220 for one of those users if one of those users is replaced by a new user. This can be useful in a situation where, for example, a car salesman has increased the value of the distance traveled 220 while demonstrating the distance bounded function 224 to customers. If that car salesman leaves the car dealership and is replaced by a new car salesman, it may be desirable to reset the distance traveled 220 for the distance bounded function 224 so that the new car salesman can have ample opportunity to demonstrate the distance bounded function 224 to customers. In such a case, the new car salesman can be given the extension code 228 for free from the vendor of the distance bounded function 224 or it can be provided for a small fee.

The resetting module 508 can be implemented, for example, by the first device 102 of FIG. 1, the second device 106 of FIG. 1, or distributed between the two. For example, the resetting module 508 can be implemented by the first communication unit 316 of FIG. 3 or the second communication unit 336 of FIG. 3 receiving the extension code 228.

The first control unit 312 or the second control unit 334 can reset the distance traveled 220. The first software 326 or the second software 342 can provide the intelligence for the resetting module 508.

The tracking module 406 can further include a security module 510 to prevent unauthorized hacking or misuse of the navigation system 100. The security module 510 can detect, for example, unauthorized hacking, modification, or misuse of the navigation system 100 or the distance bounded function 224. For example, the security module 510 can detect an unauthorized change in the first software 326 of FIG. 3 or an unauthorized change in the hardware of the navigation system 100.

The unauthorized change in the first software 326 or the hardware of the navigation system 100 can be detected in a number of ways. For example, access to the first software 326 and the hardware can be access controlled with the user identification. Without the user identification first entered and accepted by the navigation system 100.

When unauthorized hacking is detected the security module 510 can disable the navigation system 100 or the distance bounded function 224. The security module 510 can disable the navigation system 100 or the distance bounded function 224 by, for example, setting the distance limit 222 to zero, setting the distance traveled 220 to equal the distance limit 222 or by preventing the navigation system 100 from receiving inputs.

The security module 510 can be implemented, for example, by the first device 102 of FIG. 1, the second device 106 of FIG. 1, or distributed between the two. For example, the security module 510 can be implemented by the first control unit 312 or the second control unit 334 detecting unauthorized hacking, modification or misuse and disabling the distance bounded function 224 or the navigation system 100. The first software 326 or the second software 342 can provide the intelligence for the security module 510.

The tracking module 406 can also include an activation cue module 512, which determines whether or not to start or pause measuring the distance traveled 220 based on the user speed. For example, the user speed can be generated with the successive readings of the user location 212 over a predetermined time period and a linear distance traversed between the successive readings divided by the predetermined time.

The activation cue module 512 can measure the distance traveled 220 based on the method of transportation being used in order to avoid measuring the distance traveled 220 when the user is not actively using the navigation system 100. For example, the activation cue module 512 can measure the distance traveled 220 only when it detects that a power source, such as an engine, motor, or turbine, is operating. When the activation cue module 512 detects that the power source has stopped operating it can pause measuring the distance traveled 220.

By only measuring the distance traveled 220 when the power source is operating the activation cue module 512 can prevent the distance traveled 220 from being measured, for example, when the navigation system 100 is being carried in a backpack or in a pedestrians hands. This can help prevent the distance traveled 220 from being measured when the navigation system 100 or the distance bounded function 224 is not being actively used. For example, if the navigation system 100 is executing the distance bounded function 224 designed only for use by drivers then the activation cue module 512 can prevent the distance traveled 220 from being measured while the navigation system 100 is being carried to or from a vehicle by a pedestrian.

As another example, the activation cue module 512 can measure the distance traveled 220 only when it detects that a vehicle component, such as a wheel or propeller, is in motion. When the activation cue module 512 detects that the vehicle component has stopped moving the activation cue module 512 can pause measuring the distance traveled 220. This can help prevent the distance traveled 220 from being measured when the distance bounded function 224 is not being actively used, even in vehicles with no motor. For example, if the navigation system 100 is executing the distance bounded function 224 designed only for use by bicyclists the activation cue module 512 can prevent the distance traveled 220 from being measured while the navigation system 100 is being carried to or from a bicycle by a pedestrian.

As yet another example, the activation cue module 512 can start measuring the distance traveled 220 when the distance bounded function 224 designed for pedestrians is executed and can pause measuring when the activation cue module 512 determines that the user is travelling over a certain speed. For example, the activation cue module 512 can then pause measuring the distance traveled 220 for the distance bounded function 224 if it detects that the user is travelling over a speed that is reasonable for a pedestrian.

The activation cue module 512 can resume measuring the distance traveled 220 again when the user's speed falls back into a range that is reasonable for a pedestrian. This can help to prevent the distance traveled 220 from being measured when the user is not actively experiencing the distance bounded function 224. For example, if the user is testing the distance bounded function 224 designed for pedestrians and the user boards a train, the activation cue module 512 can pause measuring the distance traveled 220 when the train passes a speed that is not reasonable for a pedestrian. Since the distance bounded function 224 in this example is designed for pedestrians and is of no use on the train, this can help to ensure that the distance traveled 220 is only measured when the user is actively experiencing the distance bounded function 224.

The activation cue module 512 can also measure the distance traveled 220 without regard for the method of travel used. For example the activation cue module 512 can measure the distance traveled 220 without first detecting if the power source is in operation or the vehicle component is in motion. This can be done every time the distance bounded function 224 is executed or it can be done only when the distance bounded function 224 is being executed in a pedestrian mode or when the distance bounded function 224 is designed for use by users not travelling in a vehicle.

The activation cue module 512 can be implemented, for example, by the first device 102 of FIG. 1, the second device 106 of FIG. 1, or distributed between the two. For example, the activation cue module 512 can be implemented by the first control unit 312 or the second control unit 334 detecting the power source operating or the vehicle component in motion and starting or pausing measuring the distance traveled 220. The first software 326 or the second software 342 can provide the intelligence for the activation cue module 512.

The tracking module 406 can also include a disabling module 514 for disabling restrictions on functions of the navigation system 100 or the distance bounded function 224. The disabling module 514 can receive the disabling code 230. When the disabling module 514 receives the disabling code 230 the disabling module 514 can provide unrestricted access to the distance bounded function 224 or the navigation system 100 by, for example, stopping measuring the distance traveled 220, removing the distance limit 222 or sending an instruction to the comparison module 408 to stop comparing the distance limit 222 to the distance traveled 220. The disabling module 514 can continue to provide unrestricted access to the distance bounded function 224 or the navigation system 100 until the distance bounded function 224 or the navigation system 100 is turned off, until the user that entered the disabling code 230 logs off, or until the user that entered the disabling code 230 enters an instruction cancelling the disabling code 230.

The disabling code 230 can be provided to persons or organizations that might need privileges such as unrestricted access to the distance bounded function 224 or the navigation system 100. For example the disabling code 230 can be given to vendors, persons, or organizations that perform field repairs on the distance bounded function 224 or the navigation system 100 or persons or organizations to that are early adopter testers for the distance bounded function 224 or the navigation system 100. For example, a person who repairs the navigation system 100 may need to be able to test the navigation system 100 or the distance bounded function 224 without the possibility of the navigation system 100 or the distance bounded function 224 being disabled because of the distance limit 222 and the distance traveled 220.

The disabling module 514 can be implemented, for example, by the first device 102 of FIG. 1, the second device 106 of FIG. 1, or distributed between the two. For example, the disabling module 514 can be implemented by the first communication unit 316 or the second communication unit 336 receiving the disabling code 230. The first control unit 312 or the second control unit 334 can stop measuring the distance traveled 220. The first software 326 or the second software 342 can provide the intelligence for the disabling module 514.

The tracking module 406 describes the module functions or order as an example. The modules can be partitioned differently. For example the measuring module 502 can perform the functions of the disabling module 514 or the activation cue module 512 can perform the functions of the control module 506. Each of the modules can operate individually and independently of the other modules.

It has also been discovered that the present invention provides the navigation system 100 an effective method of operating a distance based demonstration mechanism. The navigation system 100 can provide distance based demonstrations of a number of functions at the same time by measuring the distance traveled 220 separately for each type of the distance bounded function 224. The navigation system 100 can also efficiently provide the distance based demonstration of the distance bounded function 224 to several users, allowing each user to fully experience the distance bounded function 224. The navigation system 100 can do this by separately measuring the distance traveled 220 for each user of the distance bounded function 224. The navigation system 100 can further prevent the distance traveled 220 from increasing when the user of the navigation system 100 is not actively using the distance bounded function 224. The navigation system 100 can accomplish this in an number of ways including by preventing the distance traveled 220 from being measured when a power source is not in operation, a vehicle component is in motion or when the navigation system 100 is travelling above or below a certain speed.

The physical transformation of location information, route information, navigation information, and navigation or non-navigation applications, services or products results in movement in the physical world, such as people or vehicles using the navigation system with distance based demonstration modes, based on the operation of the navigation system. As the movement in the physical world occurs, the movement itself creates additional information that is converted back to the user's location information, route information, navigation information, and navigation or non-navigation applications, services or products for the continued operation of the navigation system and to continue the movement in the physical world.

Thus, it has been discovered that the navigation system of the present invention furnishes important and heretofore unknown and unavailable solutions, capabilities, and functional aspects for providing a distance based demonstration mode.

Figure 6:
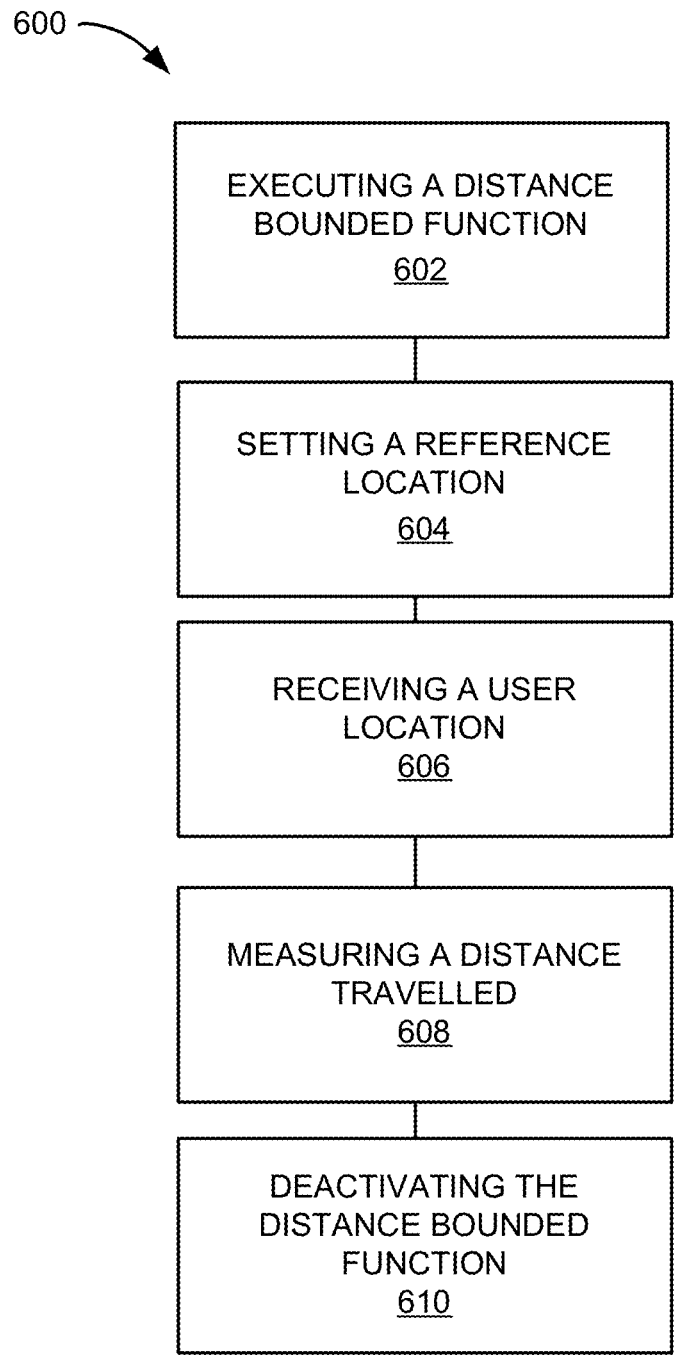
FIG. 6 is a flow chart of a method of operation of the navigation system in a further embodiment of the present invention.

Referring now to FIG. 6, therein is shown a flow chart of a method 600 of operation of the navigation system 100 in a further embodiment of the present invention. The method 600 includes: executing a distance bounded function for displaying on a device in a block 602; setting a reference location in a block 604; receiving a user location for monitoring a location of the device in a block 606; measuring a distance traveled with the user location from the reference location only when the distance bounded function is executing in a block 608; and deactivating the distance bounded function when the distance traveled equals or exceeds a distance limit in a block 610.

The resulting method, device, product, and/or system is straightforward, cost-effective, uncomplicated, highly versatile and effective, can be surprisingly and unobviously implemented by adapting known technologies, and are thus readily suited for efficiently and economically manufacturing navigation systems with distance based demonstration modes fully compatible with conventional manufacturing methods or processes and technologies.

Another important aspect of the present invention is that it valuably supports and services the historical trend of reducing costs, simplifying systems, and increasing performance.

These and other valuable aspects of the present invention consequently further the state of the technology to at least the next level.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the scope of the included claims.

All matters hithertofore set forth herein or shown in the accompanying drawings are to be interpreted in an illustrative and non-limiting sense.

What is claimed is:

1. A method of operation of a navigation system comprising:
   executing a distance bounded function for displaying on a device;
   setting a reference location;
   receiving a user location for monitoring a location of the device;
   measuring a distance traveled with the user location from the reference location only when the distance bounded function is executing; and
   deactivating the distance bounded function when the distance traveled equals or exceeds a distance limit.

2. The method as claimed in claim 1 further comprising:
   receiving an extension code; and
   resetting the distance traveled based on the extension code.

3. The method as claimed in claim 1 wherein measuring the distance traveled includes starting the measuring the distance traveled with the user location exiting or entering the reference location.

4. The method as claimed in claim 1 wherein executing the distance bounded function includes executing separately the distance bounded function based on a user identification.

5. The method as claimed in claim 1 wherein measuring the distance traveled includes measuring the distance traveled for a feature type of the distance bounded function.

6. A method of operation of a navigation system comprising:
   executing a distance bounded function for displaying on a device;
   setting a reference location;
   receiving a user location for monitoring a location of the device;
   measuring a distance traveled with the user location from the reference location only when the distance bounded function is executing;
   deactivating the distance bounded function when the distance traveled equals or exceeds a distance limit; and
   reactivating the distance bounded function with a purchase code.

7. The method as claimed in claim 6 wherein reactivating the distance bounded function includes removing the distance limit.

8. The method as claimed in claim 6 wherein reactivating the distance bounded function includes:
   receiving an extension code; and
   reactivating the distance bounded function temporarily with the extension code.

9. The method as claimed in claim 6 wherein measuring the distance traveled includes pausing measuring the distance traveled with the user location exiting or entering the reference location.

10. The method as claimed in claim 6 further comprising:
    receiving successive readings of the user location to calculate a user speed; and
    wherein measuring the distance traveled includes:
    pausing the measuring the distance traveled based on the user speed.

11. A navigation system comprising:
    a control unit for executing a distance bounded function for displaying on a device;
    a selection module, coupled to the control unit, for setting a reference location;
    a communication unit, coupled to the control unit, for receiving a user location for monitoring a location of the device;
    a measuring module, coupled to the selection module, for measuring a distance traveled with the user location from the reference location only when the distance bounded function is executing; and
    a deactivation module, coupled to the measuring module, for deactivating the distance bounded function when the distance traveled equals or exceeds a distance limit.

12. The system as claimed in claim 11 wherein:
    the communication unit is for receiving an extension code; and
    further comprising:
    a resetting module, coupled to the selection module, resetting the distance traveled based on the extension code.

13. The system as claimed in claim 11 further comprising a control module, coupled to the selection module, for starting the measuring the distance traveled with the user location exiting or entering the reference location.

14. The system as claimed in claim 11 further comprising an operation module, coupled to the measuring module, for executing separately the distance bounded function based on a user identification.

15. The system as claimed in claim 11 wherein the measuring module is for measuring the distance traveled for a feature type of the distance bounded function.

16. The system as claimed in claim 11 further comprising a reactivation module, coupled to the deactivation module, for reactivating the distance bounded function with a purchase code.

17. The system as claimed in claim 16 wherein the reactivation module is for removing the distance limit.

18. The system as claimed in claim 16 wherein:
- the communication unit is for receiving an extension code; and
- the reactivation module is for reactivating the distance bounded function temporarily with the extension code.

19. The system as claimed in claim 16 further comprising a control module, coupled to the selection module, for pausing measuring the distance traveled with the user location exiting or entering the reference location.

20. The system as claimed in claim 16 wherein:
- the communication unit is for receiving successive readings of the user location to calculate a user speed; and further comprising:
- an activation cue module, coupled to the measuring module, for pausing the measuring the distance traveled based on the user speed.

\* \* \* \* \*